(12) United States Patent
Srinivasan

(10) Patent No.: US 10,848,395 B2
(45) Date of Patent: Nov. 24, 2020

(54) STATE MANAGEMENT ACROSS DISTRIBUTED SERVICES USING CRYPTOGRAPHICALLY BOUND JOURNALS

(71) Applicant: Zscaler, Inc., San Jose, CA (US)

(72) Inventor: Subramanian Srinivasan, Milpitas, CA (US)

(73) Assignee: Zscaler, Inc., San Jose, CA (US)

( * ) Notice: Subject to any disclaimer, the term of this patent is extended or adjusted under 35 U.S.C. 154(b) by 158 days.

(21) Appl. No.: 15/949,345

(22) Filed: Apr. 10, 2018

(65) Prior Publication Data

US 2019/0312792 A1    Oct. 10, 2019

(51) Int. Cl.
| | | |
|---|---|---|
| H04L 12/58 | (2006.01) | |
| H04L 9/32 | (2006.01) | |
| H04L 12/24 | (2006.01) | |
| H04L 29/08 | (2006.01) | |

(52) U.S. Cl.
CPC ........ *H04L 41/5041* (2013.01); *H04L 9/3236* (2013.01); *H04L 67/10* (2013.01); *H04L 2209/38* (2013.01)

(58) Field of Classification Search
CPC ... H04L 41/5041; H04L 9/3236; H04L 67/10; H04L 2209/38
See application file for complete search history.

(56) References Cited

U.S. PATENT DOCUMENTS

| | | | | |
|---|---|---|---|---|
| 9,635,000 | B1* | 4/2017 | Muftic | ................ H04L 63/0435 |
| 2016/0036816 | A1 | 2/2016 | Srinivasan | |
| 2016/0330027 | A1* | 11/2016 | Ebrahimi | .............. H04L 9/3066 |
| 2017/0005804 | A1 | 1/2017 | Zinder | |
| 2017/0213209 | A1* | 7/2017 | Dillenberger | ...... G06Q 20/3829 |
| 2017/0228822 | A1 | 8/2017 | Creighton, IV et al. | |
| 2017/0230349 | A1* | 8/2017 | Gaur | ........................ G06F 21/00 |
| 2017/0330174 | A1* | 11/2017 | Demarinis | ............. G06Q 40/04 |
| 2017/0364699 | A1 | 12/2017 | Goldfarb et al. | |
| 2018/0103042 | A1* | 4/2018 | Castagna | ................ H04L 63/08 |
| 2019/0188711 | A1* | 6/2019 | Wu | ...................... G06Q 20/065 |
| 2019/0207770 | A1* | 7/2019 | Zhou | ..................... H04L 9/3247 |

OTHER PUBLICATIONS

I. D. Alvarenga, G. A. F. Rebello and O. C. M. B. Duarte, "Securing configuration management and migration of virtual network functions using blockchain," NOMS 2018—2018 IEEE/IFIP Network Operations and Management Symposium, Taipei, 2018, pp. 1-9, doi: 10.1109/NOMS.2018.8406249. (Year: 2018).*

* cited by examiner

*Primary Examiner* — Nicholas R Taylor
*Assistant Examiner* — Sanjoy Roy
(74) *Attorney, Agent, or Firm* — Clements Bernard Walker; Lawrence A. Baratta, Jr.

(57) ABSTRACT

Systems and methods for managing configurations of distributed computing services include responsive to an update to a configuration of a service, performing a write to a cryptographically bound journal; validating the write by a plurality of validators; responsive to validation of the write, permanently recording the write in the cryptographically bound journal in a block chain; and providing an update to the cryptographically bound journal to the distributed computing services.

20 Claims, 5 Drawing Sheets

STATE MANAGEMENT ACROSS DISTRIBUTED SERVICES USING CRYPTOGRAPHICALLY BOUND JOURNALS

FIELD OF THE DISCLOSURE

The present disclosure generally relates to computer and networking systems and methods. More particularly, the present disclosure relates to systems and methods for state management across distributed services using cryptographically bound journals.

BACKGROUND OF THE DISCLOSURE

Computer software design has evolved from monolithic applications to distributed microservices. A Service-Oriented Architecture (SOA) is an approach in computer software design in which application components provide services to other components such as over a network. The principles of service-orientation are independence of any vendor, product, or technology. A service is a self-contained unit of functionality and services can be combined to provide the functionality of a large software application. Every computer can run any number of services, and each service is built in a way that ensures that the service can exchange information with any other service in the network without human interaction and without the need to make changes to the underlying program itself. Microservices are a variant of SOA used to build distributed software systems. Similar to SOA, services in a Microservice Architecture (MSA) are processes that communicate with each other over the network in order to fulfill an objective, and these services use technology-agnostic protocols. In a Microservice Architecture, services should be small, and the protocols should be lightweight. The benefit of distributing different responsibilities of the system into different smaller services is that it enhances the cohesion and decreases the coupling. This makes it much easier to change and add functions and qualities to the system anytime.

Microservices need to access data for various aspects such as its own configuration, customer configurations, and other service configurations. Also, there can be more than one service updating this configuration. The conventional approach for service configuration is to store all the artifacts of the configuration in a centralized data store such as a relational database. All the services connect to and fetch data from the centralized data store. Disadvantageous, this model has issues scaling as the number of services grows and due to dependency on state injected by other services outside its domain. For example, distributed devices, such as Internet of Things (IoT) devices, can have large number of devices trying to send/receive data from the centralized data store. Another example includes the use of distributed databases such as Cassandra which eventually is consistent. There are significant issues including how to track service updates in the centralized or distributed data store, how to update and rollback, etc.

BRIEF SUMMARY OF THE DISCLOSURE

In an exemplary embodiment, a method of managing configurations of distributed computing services includes, responsive to an update to a configuration of a service, performing a write to a cryptographically bound journal; validating the write by a plurality of validators; responsive to validation of the write, permanently recording the write in the cryptographically bound journal in a block chain; and providing an update to the cryptographically bound journal to the distributed computing services. The distributed computing services can include microservices, and the configuration can include any of a configuration of the microservice, a customer configuration for the microservice, and a configuration of the microservice for operation with other services. The write can be permanently recorded in the cryptographically bound journal and only new changes are applied. The method can further include performing a read of the cryptographically bound journal by the service. The method can further include performing a simultaneous read and write of the cryptographically bound journal by the service. The cryptographically bound journal can be represented by a Merkle tree. The plurality of validators can be separate services from the distributed computing services. The distributed computing services can be the plurality of validators.

In another exemplary embodiment, a cryptographically bound journal system configured to manage configurations of distributed computing services includes a plurality of distributed computing services; a plurality of validators, wherein the plurality of distributed services and the plurality of validators are each executed on one or more processors; wherein, responsive to an update to a configuration of a service, a write is performed to a cryptographically bound journal which is a distributed data store stored with each of the plurality of distributed computing services; wherein, responsive to validation of the write by the plurality of validators, the write is permanently recorded in the cryptographically bound journal in a block chain, and an update to the cryptographically bound journal is provided to the distributed computing services. The distributed computing services can include microservices, and the configuration can include any of a configuration of the microservice, a customer configuration for the microservice, and a configuration of the microservice for operation with other services. The write can be permanently recorded in the cryptographically bound journal and only new changes are applied. The service can be configured to perform a read of the cryptographically bound journal. The service can be configured to perform a simultaneous read and write of the cryptographically bound journal. The cryptographically bound journal can be represented by a Merkle tree. The plurality of validators can be separate services from the plurality of distributed computing services. The plurality of distributed computing services can be the plurality of validators.

In a further exemplary embodiment, a non-transitory computer-readable medium including instructions that, when executed, cause a processor to perform steps of, responsive to an update to a configuration of a service, performing a write to a cryptographically bound journal; validating the write by a plurality of validators; responsive to validation of the write, permanently recording the write in the cryptographically bound journal in a block chain; and providing an update to the cryptographically bound journal to the distributed computing services. The distributed computing services can include microservices, and the configuration can include any of a configuration of the microservice, a customer configuration for the microservice, and a configuration of the microservice for operation with other services. The write can be permanently recorded in the cryptographically bound journal and only new changes are applied. The cryptographically bound journal can be represented by a Merkle tree.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

In various exemplary embodiments, the present disclosure relates to systems and methods for state management across distributed services using cryptographically bound journals. To address the deficiencies of the centralized or distributed data store, the systems and methods described herein have no notion of a central configuration store, every service has a complete/partial copy of entities that are replicated and stored across many services in the system. A write operation to this sore by any entity can only be accepted when other entities vouch for it. Every write to this distributed store is permanently recorded as blocks chained cryptographically. One cannot erase any record of any writes or modify any, only new changes can be applied. This solves the numerous problems outlined in the current state of affairs. Advantageously, this approach ensures a scalable, trustable model for the distribution of information in a distributed computing environment. Specifically, the systems and methods improve the functionality of distributed services by improving scalability (no centralized data store which can be a bottleneck) and security (entries cannot be deleted in the journal, only changed).

Exemplary Microservices System

Figure 1:
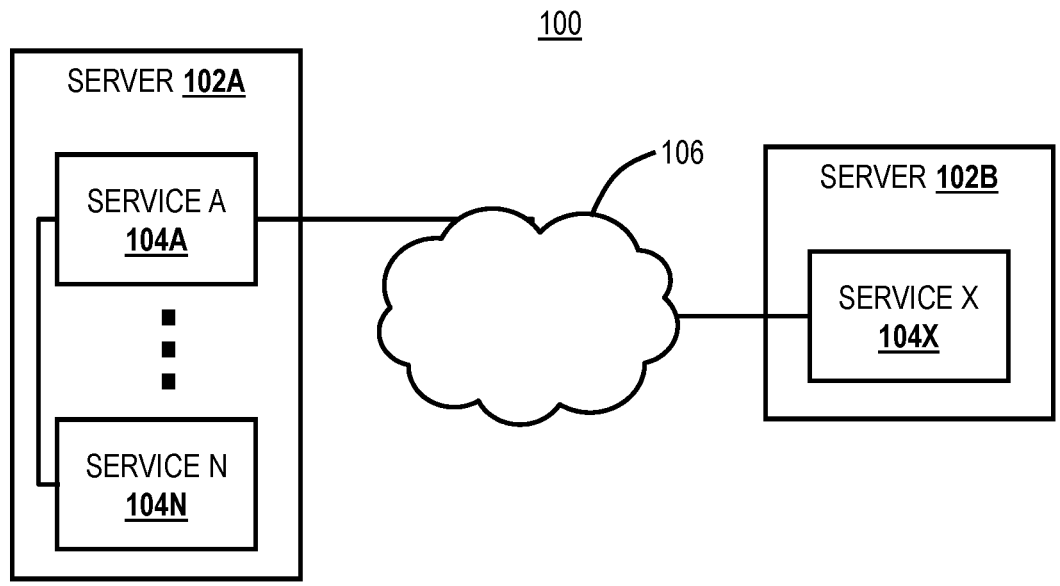
FIG. 1 is a network diagram of a services system with two exemplary servers executing exemplary services.

FIG. 1 is a network diagram of a services system 100 with two exemplary servers 102A, 102B executing exemplary services 104A, 104N, 104X. In this example, the server 102A executes the services 104A, 104N, and the server 102B executes the service 104X. The servers 102A, 102B are communicatively coupled to one another over a network 106. The network 106 can be a Local Area Network (LAN), a wireless LAN (WLAN), a Wide Area Network (WAN), a data center network, the Internet, any other type of network, and a combination thereof. The servers 102A, 102B can be physical servers in racks, Virtual Machines (VM), blades, or the like. The services 104A, 104N, 104X can be microservices or any other type of service in an SOA or other distributed software architecture. The services 104A, 104N, 104X are each a self-contained unit of functionality, and each can communicate with one another. The services 104A, 104N, 104X can be organized around their capabilities. The services 104A, 104N, 104X can be implemented using different programming languages, databases, hardware and software environment, etc. The services 104A, 104N and the service 104X are illustrated on different physical hardware. As described herein, performance monitoring of each is siloed such that there is no unified view of the collective operations of these services 104A, 104N, 104X. Rather, the conventional approaches to performance monitoring are localized to the servers 102A, 102B.

Software systems, such as the system 100, leveraging a microservice architecture include a set of independent processes (denoted as the services 104A, 104N, 104X) that communicate via the network 106 to accomplish the desired goal. The microservice architecture facilitates the development of modular software. In contrast to a monolithic architecture (single service), the services 104A, 104N, 104X in a microservice architecture are typically small and atomic, that is, they perform a single function. They communicate with each other via lightweight technology agnostic network protocols.

This architecture provides the various advantages. This architecture provides ease of development as each service 104A, 104N, 104X is small and focused, it includes a smaller code base, which is easier to understand, modify, test and deploy. This architecture provides flexibility and reusability as the microservices perform a single function and are independent of each other, this architecture facilitates and encourages the development of reusable components (microservices) that can be combined in a flexible way to perform the desired action. This microservice architecture enables the use of different technologies (i.e., programming languages) for different services 104A, 104N, 104X in the system 100, resulting in greater flexibility to select the technology best suited to perform the desired job.

This architecture improves scalability and resilience. In order to scale a large monolithic system, the complete system has to be scaled together. On the other hand, when a microservice becomes a performance bottleneck, it can be scaled independently of the rest of the application, resulting in an optimized usage of the infrastructure. If a monolithic application encounters a failure, a nearly complete loss of functionality is experienced. In contrast, if a microservice fails only a particular, relatively small, loss of functionality is experienced that is much easier to debug and rectify. Microservices are also more lightweight and faster to reboot, resulting in short downtime in the case of a failure.

Although the microservice architecture has the advantages listed above, it introduces some new challenges compared to monolithic systems. This architecture increases the complexity of the system 100 by creating independent services 104A, 104N, 104X that communicate via the network 106, hence managing network latency, achieving high message throughputs, enabling load balancing and fault tolerance becomes very challenging. These difficulties arise from the fact that the services 104A, 104N, 104X are independent and may be distributed on multiple machines (the servers 102A, 102B) which renders traditional intra-service performance monitoring and/or analysis insufficient for successful system monitoring. In order to truly monitor, troubleshoot and tune the system 100, the performance metrics/indicators from all the services 104A, 104N, 104X should be captured and analyzed collectively. Also, the system 100 has a lot of interaction points between different microservices, which increases possible failure points. Moreover, the scalability model for each individual service 104A, 104N, 104X is hard to establish prior to a deployment, which often results in a non-optimal run-time system configuration. In essence, for a reasonably large microservices-based system, it is nearly impossible to monitor, troubleshoot and tune the entire system in real-time without having an automated solution for system-wide analysis of performance metrics and an automatic agent that performs corrective measures in the system based on actionable insights generated from the data.

Exemplary Server

Figure 2:
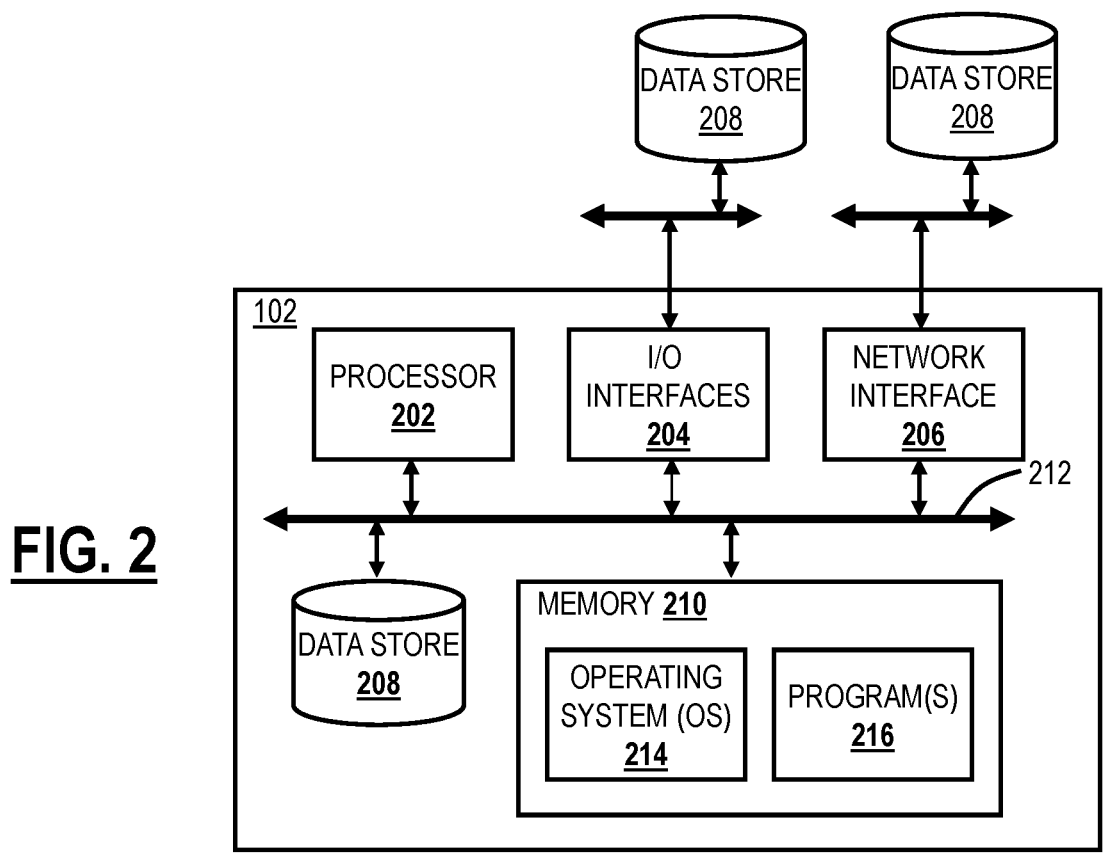
FIG. 2 is a block diagram of an exemplary implementation of the server.

FIG. 2 is a block diagram of an exemplary implementation of the server 102. The server 102 can be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 102 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the server 102, a semiconductor-based microprocessor (in the form of a microchip or chip set), or generally any device for executing software instructions. When the server 102 is in operation, the processor 202 is configured to execute software stored within the memory 210, to communicate data to and from the memory 210, and to generally control operations of the server 102 pursuant to the software instructions. The I/O interfaces 204 can be used to receive user input from and/or for providing system output to one or more devices or components. User input can be provided via, for example, a keyboard, touchpad, and/or a mouse. System output can be provided via a display device and a printer (not shown). I/O interfaces 204 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 can be used to enable the server 102 to communicate on a network, such as a network. The network interface 206 can include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 can include address, control, and/or data connections to enable appropriate communications on the network. A data store 208 can be used to store data. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the server 102 such as, for example, an internal hard drive connected to the local interface 212 in the server 102. Additionally, in another embodiment, the data store 208 can be located external to the server 102 such as, for example, an external hard drive connected to the I/O interfaces 304 (e.g., SCSI or USB connection). In a further embodiment, the data store 208 can be connected to the server 102 through a network, such as, for example, a network attached file server.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 can incorporate electronic, magnetic, optical, and/or other types of storage media. Note that the memory 210 can have a distributed architecture, where various components are situated remotely from one another, but can be accessed by the processor 202. The software in memory 210 can include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. The services 104 can be instructions in the memory 210 and/or the data store 208 which are executed by the processor 202.

Exemplary Cloud System Architecture

Figure 3:
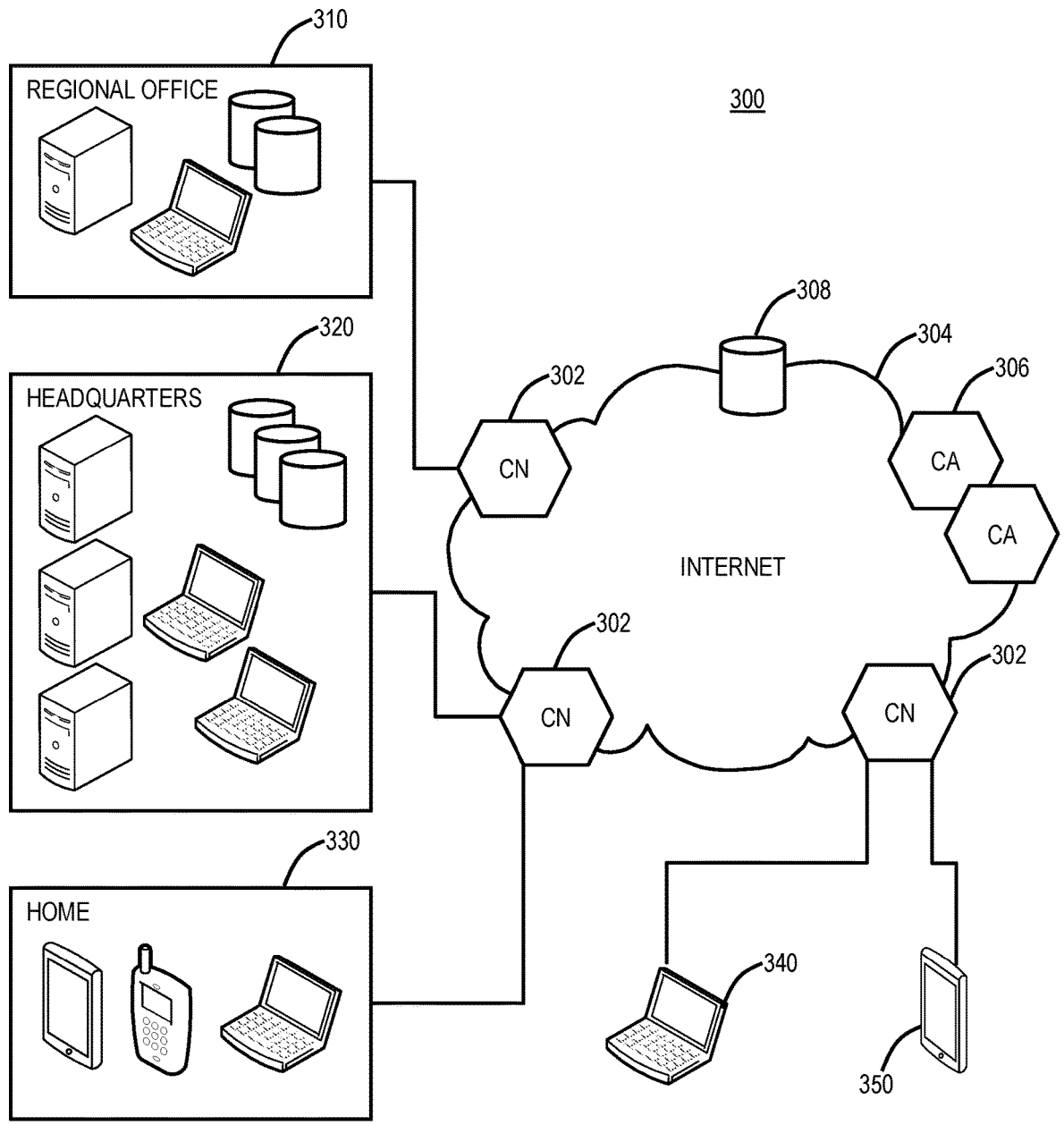
FIG. 3 is a network diagram of a cloud-based system for implementing various cloud-based service functions.

FIG. 3 is a network diagram of a cloud-based system 300 for implementing various cloud-based service functions. The cloud-based system 300 includes one or more cloud nodes (CN) 302 communicatively coupled to the Internet 304 or the like. Also, the cloud-based system 300 can also include one or more Central Authorities (CA) 306 and one or more log nodes 308, and each of the components 302, 306, 308 can be communicatively coupled to one another via the Internet 304. The cloud nodes 302, the central authorities 306, and the log nodes 308 may be implemented as a server 102 (as illustrated in FIG. 2), or the like, and can be geographically diverse from one another such as located at various data centers around the country or globe. For illustration purposes, the cloud-based system 300 can connect to a regional office 310, headquarters 320, various employee's homes 330, laptops/desktops 340, and mobile devices 350 each of which can be communicatively coupled to one of the cloud nodes 302 via the Internet 304. These locations 310, 320, 330 and devices 340, 350 are shown for illustrative purposes, and those skilled in the art will recognize there are various access scenarios to the cloud-based system 300 all of which are contemplated herein.

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud." The cloud-based system 300 is illustrated herein as one exemplary embodiment of a cloud-based system, and those of ordinary skill in the art will recognize the systems and methods described herein contemplate operation with any cloud-based system.

Again, the cloud-based system 300 can provide any functionality through services such as software as a service, platform as a service, infrastructure as a service, security as a service, Virtual Network Functions (VNFs) in a Network Functions Virtualization (NFV) Infrastructure (NFVI), etc. to the locations 310, 320, 330 and devices 340, 350. The cloud-based system 300 is replacing the conventional deployment model where network devices are physically managed and cabled together in sequence to deliver the various services associated with the network devices. The cloud-based system 300 can be used to implement these services in the cloud without end users requiring the physical devices and management thereof. The cloud-based system 300 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 300 can provide other services in addition to VNFs, such as X-as-a-Service (XaaS) where X is security, access, etc.

In an exemplary embodiment, the cloud-based system 300 can be a distributed security system or the like. Here, in the cloud-based system 300, traffic from various locations (and various devices located therein) such as the regional office 310, the headquarters 320, various employee's homes 330, laptops/desktops 340, and mobile devices 350 can be monitored or redirected to the cloud through the cloud nodes 302. That is, each of the locations 310, 320, 330, 340, 350 is communicatively coupled to the Internet 304 and can be monitored by the cloud nodes 302. The cloud-based system 300 may be configured to perform various functions such as spam filtering, uniform resource locator (URL) filtering, antivirus protection, malware detection, bandwidth control, Data Leakage Prevention (DLP), zero-day vulnerability protection, web 2.0 features, and the like. In an exemplary embodiment, the cloud-based system 300 may be viewed as Security-as-a-Service through the cloud.

In an exemplary embodiment, the cloud-based system 300 can be configured to provide mobile device security and policy systems and methods. The mobile device 350 may be similar to the server 102 (as illustrated in FIG. 2) and may include common devices such as laptops, smartphones, tablets, netbooks, personal digital assistants, MP3 players, cell phones, e-book readers, and the like. The cloud-based system 300 is configured to provide security and policy enforcement for devices including the mobile devices 350 in the cloud. Advantageously, the cloud-based system 300, when operating as a distributed security system, avoids platform-specific security apps on the mobile devices 350, forwards web traffic through the cloud-based system 300, enables network administrators to define policies in the cloud, and enforces/cleans traffic in the cloud prior to delivery to the mobile devices 350. Further, through the cloud-based system 300, network administrators may define user-centric policies tied to users, not devices, with the policies being applied regardless of the device used by the user. The cloud-based system 300 provides 24×7 security with no need for updates as the cloud-based system 300 is always up-to-date with current threats and without requiring device signature updates. Also, the cloud-based system 300 enables multiple enforcement points, centralized provisioning, and logging, automatic traffic routing to the nearest cloud node 302, geographical distribution of the cloud nodes 302, policy shadowing of users which is dynamically available at the cloud nodes 302, etc.

As a cloud-based security system, the cloud-based system 300 has a distributed network, multi-tenant architecture. The cloud-based system 300 is configured to examine traffic over all ports and protocols including SSL encrypted traffic. The policies are configured to follow the user, regardless of their location or device. The cloud-based system 300 can provide security functionality combining findings from various different approaches to deliver a holistic perspective. The cloud-based system 300 can be capable of recognizing threats independent of signature feeds, and the cloud-based system 300 can propagate threat information across the cloud in real-time, i.e., zero-day or zero-hour determinations such as between the cloud nodes 302 and the central authority 306.

The objective of the cloud-based system as a cloud-based security system is a multi-tenant (multiple users, companies, etc. on the same platform) and highly scalable system through functionally distributes components of a standard proxy to create a giant global network that acts as a single virtual proxy. The user can go to any gateway (cloud node 302) at any time for policy-based secure Internet access. Two exemplary services for the cloud-based system 300 can include Zscaler Internet Access (which can generally be referred to as Internet Access (IA)) and Zscaler Private Access (which can generally be referred to as Private Access (PA)), from Zscaler, Inc. (the assignee of the present application). The IA service can include firewall, threat prevention, Deep Packet Inspection (DPI), DLP, and the like. The PA can include access control, micro service segmentation, etc. For example, the IA service can provide a user with Internet Access and the PA service can provide a user with access to enterprise resources in lieu of traditional Virtual Private Networks (VPNs).

The central authority 306 is a supervisory management node, i.e., the "brains" of the cloud-based security system. The central authority 306 manages and monitors all cloud nodes 102 and ensures that they are always up-to-date with the latest real-time feeds and software and that they are synchronized to propagate threat intelligence cloud-wide. The central authority 306 directs users to the closest cloud node 302, ensuring that policy follows the user with minimum latency. The central authorities 306 are a globally distributed peer-to-peer cluster with an automatically elected master. This ensures all cloud components can always talk to a central authority 306 even if there are major Internet 304 outages that isolate an entire region. Through its multi-tenant architecture, the central authority 306 provides each organization with its own secure portal to administer policy. Any change to the policy is communicated to the cloud nodes 302 within seconds. The central authority 306 provides an end-user authentication framework through integration with Secure Lightweight Directory Access Protocol (LDAP) or ID Federation systems.

The cloud nodes 302 are configured to interface traffic with the users, e.g., the locations 310, 320, 330 and devices 340, 350. The cloud nodes 302 are configured to perform security, management, and compliance policies for the users, with the policies served by the central authority 306. The cloud nodes 302 can be an inline proxy that enforces policies on a user-level granularity. The cloud nodes 302 can scan every byte of a request, content, responses, and all related data for inline blocking of threats like viruses, cross-site scripting (XSS), and botnets. This capability also enables Dynamic Content Classification (DCC) of unknown sites. By scanning each page, the cloud nodes 302 can determine a risk index for every page loaded that enables administrators to control content served to their users based on acceptable risk. The cloud nodes 302 can include authentication and policy distribution mechanisms that enables any user to connect to any cloud node 302 at any time enabling enterprises to simply point traffic to any cloud node 302 to ensure full policy enforcement while getting all reports back in real-time.

The log nodes 308 can be integrated with the cloud nodes 302 or separate. The log nodes 308 are configured to maintain logs of all user transactions, in a compressed manner. The logs can be transmitted every second to the log nodes 308 over secure connections from the cloud nodes 302, as well as a multicast to multiple servers for redundancy. The log nodes 308 provide an administrator with real-time reports and the capability to query complete transaction-level details for any user, department, or location at any time in seconds. Data privacy and security are fundamental to any multi-tenant architecture. The cloud-based security system can provide privacy protection at a transaction level by avoiding any storage of transaction content. For example, transaction content is never written to disk but takes place in memory. The log nodes 308 can store and transfer logs in an encrypted format.

Cryptographically Bound Journals

Figure 4:
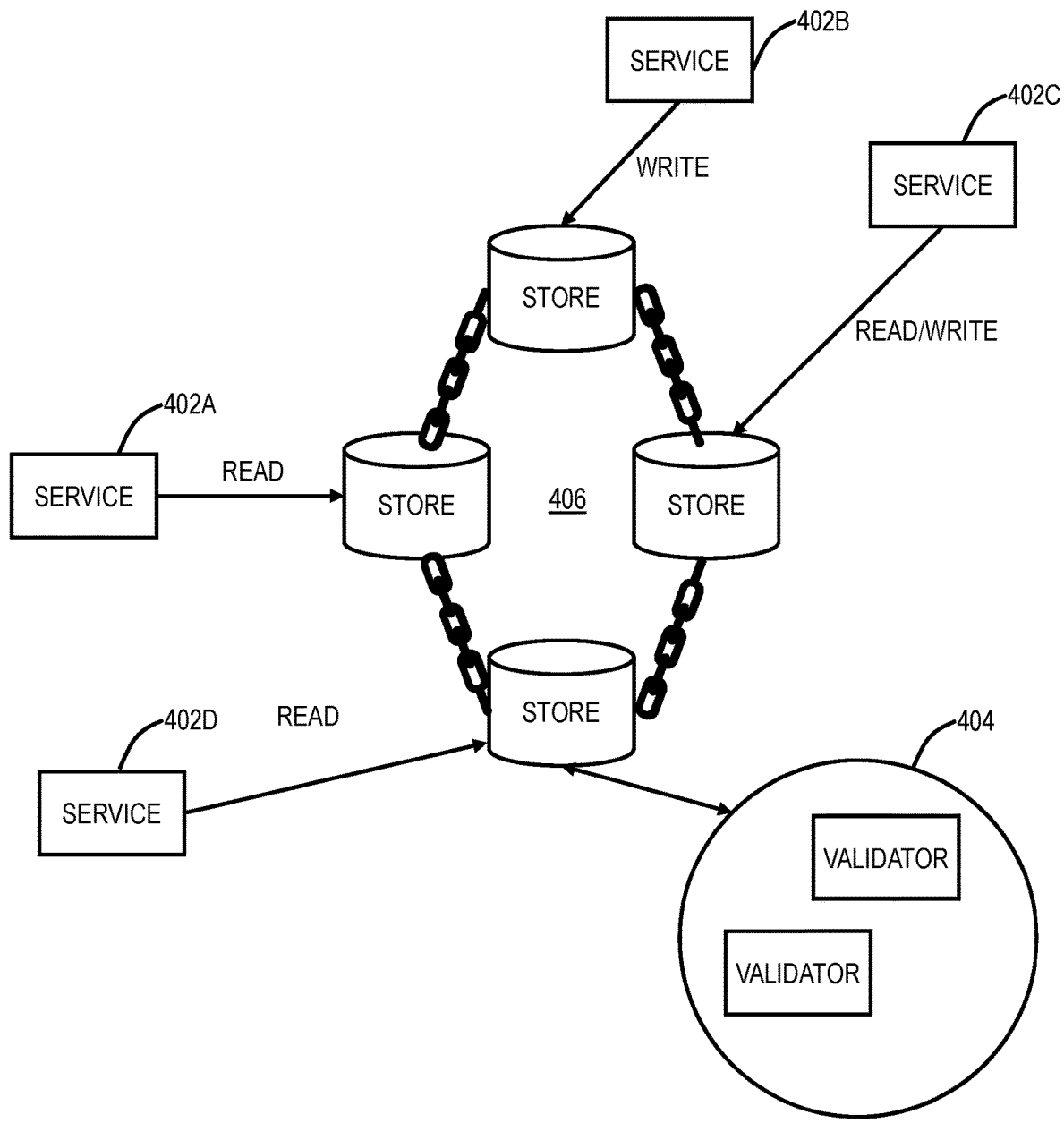
FIG. 4 is a diagram of a cryptographically bound journal system.

FIG. 4 is a diagram of a cryptographically bound journal system 400. Again, the systems and methods the provide state management across distributed services using cryptographically bound journals. The cryptographically bound journal system 400 includes a distributed set of services 402 (labeled as services 402A, 402B, 402C, 402D). The services 402 as described here are distributed software components operating on a server 200, a Virtual Machine (VM), etc. For example, the services 402 can be microservices or the like. Each of the services 402 include a plurality of configurations such as its own configuration, customer configurations, and other service configurations. Further, each of the services 402 include cryptographically signed entities which represent the plurality of configurations. This is performed in lieu of using a centralized data store for all of the plurality of configurations. Also, each of the services 402 can read, write (update), or both on these configurations.

The cryptographically bound journals can utilize blockchain or the like to provide a distributed database of the plurality of configurations for all of the services 402. The set of cryptographic primitives written to stores are called journals. The blockchain is a public ledger of all configurations for the services 402. A block is the "current" part of a blockchain which records some or all of the recent configurations, and once completed, goes into the blockchain as a permanent database. Each time a block gets completed, a new block is generated. Blocks are linked to each other (like a chain) in proper linear, chronological order with every block containing a hash of the previous block. The blockchain is like a full history of the configurations.

The cryptographically bound journal system 400 includes another set of services called validators 404. The validators 404 are configured to validate update operations to the cryptographically bound journals. The update operations are performed through a distributed data store 406 which can operate as a Peer-to-Peer network for purposes of distributed validated updates to the cryptographically bound journals. A single validator 404 cannot approve any writes into the store, they need a consensus to approve transactions. Once a write is approved by the validator 404, it is reflected in the distributed chain and cannot be rolled back. In another embodiment, the services 402 themselves can take on the role of the validators 404 (as opposed to separate validator 404 services). Thus, the validators 404 can be a separate set of services that approve the write, a subset of existing services that can approve the writes, or a combination thereof.

The cryptographically bound journals can be generic (schema-less) or specialized (schema-based) to hold specific types of information related to the plurality of configurations. All information stored is store is represented by Merkle trees which are cryptographically secure and each tree node data is opaque. A Merkle tree (also known as a hash tree) is a tree in which every leaf node is labeled with the hash of a data block and every non-leaf node is labeled with the cryptographic hash of the labels of its child nodes. Hash trees allow efficient and secure verification of the contents of large data structures. Hash trees are a generalization of hash lists and hash chains.

Figure 5:
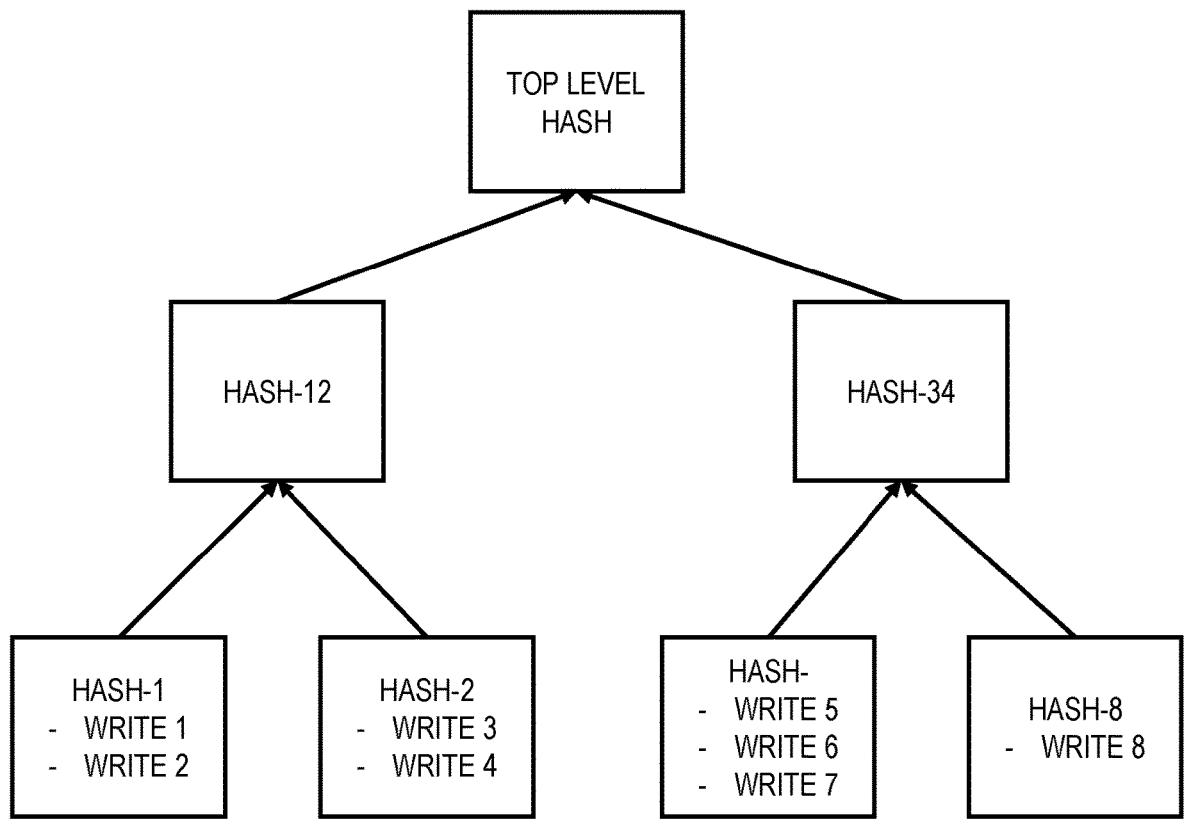
FIG. 5 is a diagram of a Merkle tree for the cryptographically bound journal system.

FIG. 5 is a diagram of a Merkle tree 450 for the cryptographically bound journal system. Of note, the data stored in the Merkle tree 450 for the cryptographically bound journal is opaque. If one want this data to be confidential, it must first be encrypted prior to being inserted in the Merkle tree 450.

The distributed data store 406 includes the cryptographically bound journals. Each service 402 can include a copy of the cryptographically bound journals which are updated through peer-to-peer techniques. In the example of FIG. 4, the services 402A, 402D perform a READ operation, the service 402B performs a WRITE operation, and the service 402C performs a simultaneous READ/WRITE operation. Further, each copy of the cryptographically bound journal in the distributed data store 406 is cryptographically bound to one another.

The cryptographically bound journal system 400 has no notion of a central configuration store, every service 402 has a complete/partial copy of entities that are replicated and stored across many services 402 in the system 400. Writes to this store by any entities can only be accepted when other entities can vouch for them. Every write to this distributed store is permanently recorded as blocks chained cryptographically. One cannot erase any record of any writes or modify any, only new changes can be applied. This solves the numerous problems outlined in the current state of affairs.

Process of Managing Configurations of Distributed Computed Services

Figure 6:
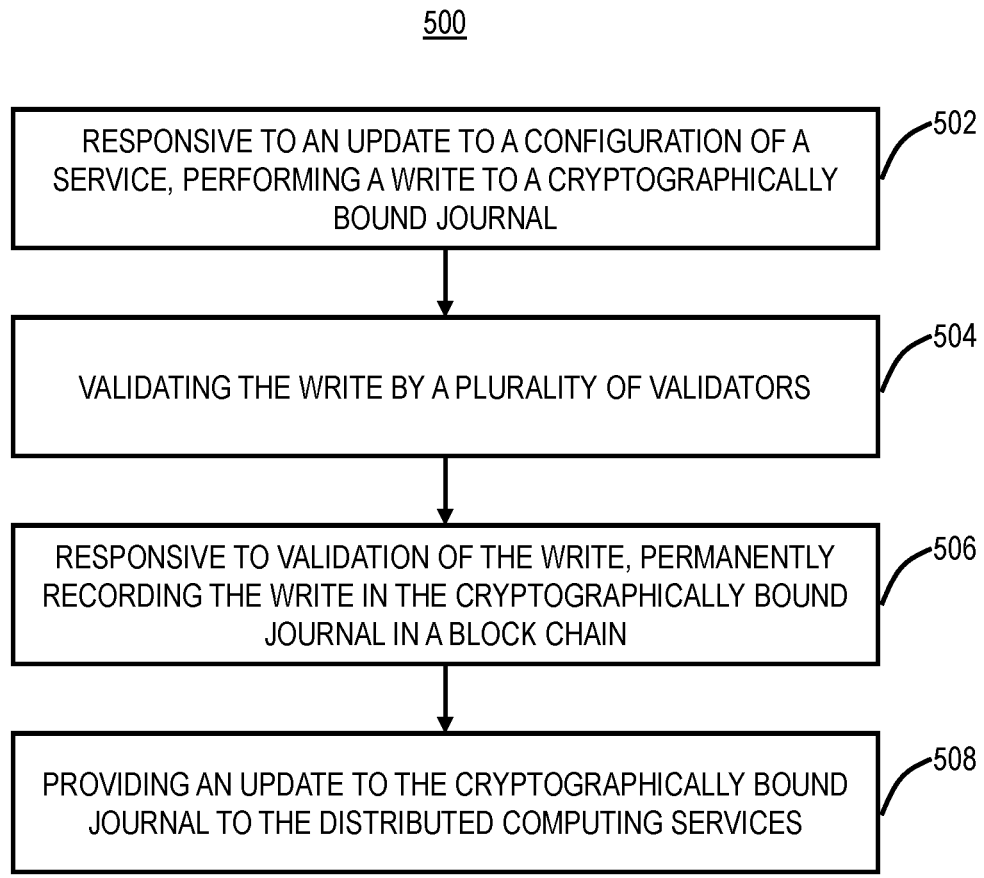
FIG. 6 is a flowchart of a process of managing configurations of distributed computing services.

FIG. 6 is a flowchart of a process 500 of managing configurations of distributed computing services 402. The process 500 includes, responsive to an update to a configuration of a service, performing a write to a cryptographically bound journal (step 502); validating the write by a plurality of validators (step 504); responsive to validation of the write, permanently recording the write in the cryptographically bound journal in a block chain (step 506); and providing an update to the cryptographically bound journal to the distributed computing services (step 508). The distributed computing services can include microservices, and the configuration can include any of a configuration of the microservice, a customer configuration for the microservice, and a configuration of the microservice for operation with other services.

The write can be permanently recorded in the cryptographically bound journal and only new changes are applied. The process 500 can further include performing a read of the cryptographically bound journal by the service. The process 500 can further include performing a simultaneous read and write of the cryptographically bound journal by the service. The cryptographically bound journal can be represented by a Merkle tree. The plurality of validators can be separate services from the distributed computing services. The distributed computing services are can be the plurality of validators.

In another exemplary embodiment, a cryptographically bound journal system configured to manage configurations of distributed computing services includes a plurality of distributed computing services; a plurality of validators, wherein the plurality of distributed services and the plurality of validators are each executed on one or more processors; wherein, responsive to an update to a configuration of a service, a write is performed to a cryptographically bound journal which is a distributed data store stored with each of the plurality of distributed computing services; wherein, responsive to validation of the write by the plurality of validators, the write is permanently recorded in the cryptographically bound journal in a block chain, and an update to the cryptographically bound journal is provided to the distributed computing services.

In a further exemplary embodiment, a non-transitory computer-readable medium including instructions that, when executed, cause a processor to perform steps of, responsive to an update to a configuration of a service, performing a write to a cryptographically bound journal; validating the write by a plurality of validators; responsive to validation of the write, permanently recording the write in the cryptographically bound journal in a block chain; and providing an update to the cryptographically bound journal to the distributed computing services.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of managing configurations of distributed computing services, the method comprising:
    responsive to an update to a configuration of a service of the distributed computing services, performing a write to a plurality of journals in a distributed data store stored with the distributed computing services, the plurality of journals being cryptographically bound and comprising cryptographically signed entities representing the configurations of the distributed computing services;
    validating the write by a plurality of validators;
    responsive to validation of the write, permanently recording the write in the plurality of journals in a block chain; and
    providing an update of the plurality of journals to the distributed computing services,
    wherein each of the distributed computing services includes a copy of the plurality of journals and copies of the plurality of journals of the distributed computing services are cryptographically bound to one another, and each copy includes one of a complete copy and partial copy of the cryptographically signed entities representing the configurations of the distributed services that are replicated and stored across the distributed computing services.

2. The method of claim 1, wherein the distributed computing services comprise microservices, and the configuration comprises any of a configuration of the microservice, a customer configuration for the microservice, and a configuration of the microservice for operation with other services.

3. The method of claim 1, wherein the write is permanently recorded in the plurality of journals and only new changes are applied.

4. The method of claim 1, further comprising:
    performing a read of a journal by the service.

5. The method of claim 1, further comprising:
performing a simultaneous read and write of a journal by the service.

6. The method of claim 1, wherein the plurality of journals is represented by a Merkle tree.

7. The method of claim 1, wherein the plurality of validators are separate services from the distributed computing services.

8. The method of claim 1, wherein the distributed computing services are the plurality of validators.

9. A cryptographically bound journal system configured to manage configurations of distributed computing services, the cryptographically bound journal system comprising:
a plurality of distributed computing services;
a plurality of validators, wherein the plurality of distributed services and the plurality of validators are each executed on one or more processors;
wherein, responsive to an update to a configuration of a service of the distributed computing services, a write is performed to a plurality of journals in a distributed data store stored with the plurality of distributed computing services, the plurality of journals being cryptographically bound and comprising cryptographically signed entities representing the configurations of the plurality of distributed computing services;
wherein, responsive to validation of the write by the plurality of validators, the write is permanently recorded in the plurality of journals in a blockchain, and an update to the plurality of journals is provided to the plurality of distributed computing services, and
wherein each of the plurality of distributed computing services includes a copy of the plurality of journals and copies of the plurality of journals of the plurality of the distributed computing services are cryptographically bound to one another, and each copy includes one of a complete copy and partial copy of the cryptographically signed entities representing the configurations of the distributed services that are replicated and stored across the distributed computing services.

10. The cryptographically bound journal system of claim 9, wherein the plurality of distributed computing services comprise microservices, and the configuration comprises any of a configuration of the microservice, a customer configuration for the microservice, and a configuration of the microservice for operation with other services.

11. The cryptographically bound journal system of claim 9, wherein the write is permanently recorded in the plurality of journals and only new changes are applied.

12. The cryptographically bound journal system of claim 9, wherein the service is configured to perform a read of a journal.

13. The cryptographically bound journal system of claim 9, wherein the service is configured to perform a simultaneous read and write of a journal.

14. The cryptographically bound journal system of claim 9, wherein the plurality of journals is represented by a Merkle tree.

15. The cryptographically bound journal system of claim 9, wherein the plurality of validators are separate services from the plurality of distributed computing services.

16. The cryptographically bound journal system of claim 9, wherein the plurality of distributed computing services are the plurality of validators.

17. A non-transitory computer-readable medium comprising instructions that, when executed, cause a processor to perform steps of:
responsive to an update to a configuration of a service of the distributed computing services, performing a write to a plurality of journals in a distributed data store stored with the distributed computing services, the plurality of journals being cryptographically bound and comprising cryptographically signed entities representing the configurations of the distributed computing services;
validating the write by a plurality of validators;
responsive to validation of the write, permanently recording the write in the plurality of journals in a block chain; and
providing an update to the plurality of journals to the distributed computing services,
wherein each of the distributed computing services includes a copy of the plurality of journals and copies of the plurality of journals of the distributed computing services are cryptographically bound to one another, and each copy includes one of a complete copy and partial copy of the cryptographically signed entities representing the configurations of the distributed services that are replicated and stored across the distributed computing services.

18. The non-transitory computer-readable medium of claim 17, wherein the distributed computing services comprise microservices, and the configuration comprises any of a configuration of the microservice, a customer configuration for the microservice, and a configuration of the microservice for operation with other services.

19. The non-transitory computer-readable medium of claim 17, wherein the write is permanently recorded in the plurality of journals and only new changes are applied.

20. The non-transitory computer-readable medium of claim 17, wherein the plurality of journals is represented by a Merkle tree.

* * * * *